Sept. 28, 1965
R. A. HERREMAN
3,208,278
MILEAGE INDICATOR
Filed July 30, 1962
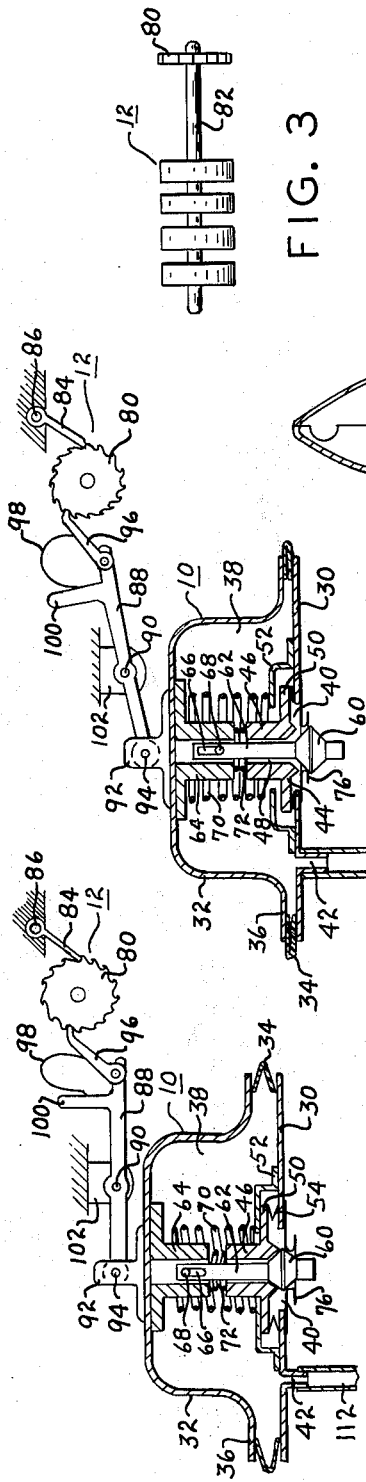
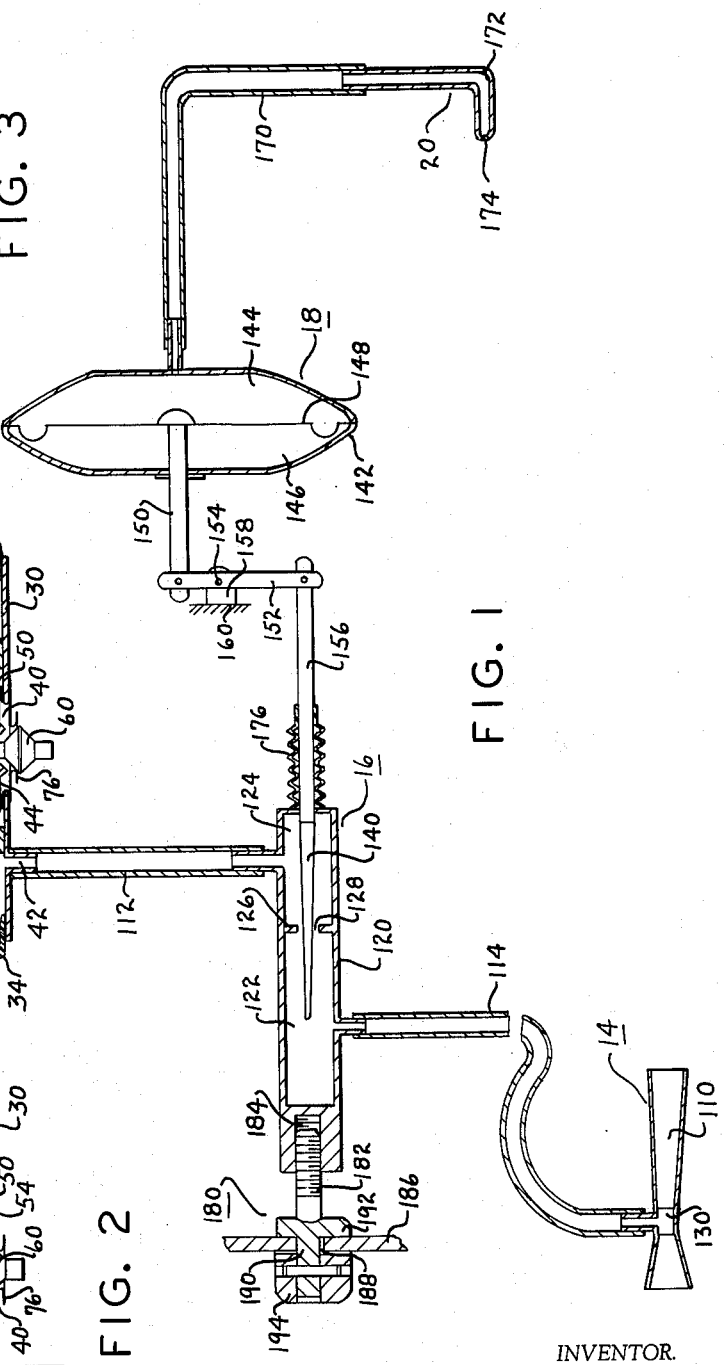
INVENTOR.
ROBERT A. HERREMAN
BY Hobbs & Easton
ATTORNEYS United States Patent Office 3,208,278
Patented Sept. 28, 1965

1

3,208,278
MILEAGE INDICATOR
Robert A. Herreman, 1402 Chester St., South Bend, Ind.
Filed July 30, 1962, Ser. No. 213,471
9 Claims. (Cl. 73—183)

The present invention relates to mileage indicators and more particularly to a mileage indicator for boats and other water craft.

The conventional mileage or distance indicators used on boats, particularly the smaller craft, employ a propeller or wheel which is secured to the bottom of the craft and the rotation of which is transmitted to a counter mounted on the instrument panel in the boat. The propeller of this type of mileage indicator is difficult and often expensive to install on the boat and is difficult to maintain in a satisfactory, serviceable operating condition, in that the propeller or wheel frequently becomes clogged and fouled with foreign matter and debris, such as weeds and scum, and is easily damaged by underwater obstructions such as stumps, stones and logs. The accuracy of this type of indicator is likewise difficult to maintain and accurate adjustment from time to time is at best inconvenient and often not possible. It is therefore one of the principal objects of the present invention to provide a relatively simple and inexpensive mileage indicator for use on boats and other water craft, which can be easily installed on the boat and thereafter readily cleaned and serviced as required, and which employs a basic principle and mechanism such that it can be effectively installed on any type of water craft without the use of any electrical connections or other special sources of power.

Another object of the invention is to provide a mileage indicator for water craft, which is principally confined within the craft, utilizing only one or two relatively small, fixed, non-rotatable probes positioned in close proximity to the bottom of the craft where they will not readily become fouled or clogged with foreign matter or become damaged by underwater obstructions.

Still another object of the invention is to provide a compact, versatile mileage indicator which can be mounted on a variety of different types of water craft without utilizing any type of power take-off, and which permits the counter or other distance registering instrument to be mounted in any convenient place in or on the craft without regard to the position of the water probes of the indicator or the distance of the probes from the location of the registering instrument.

A further object is to provide a distance indicator of the aforesaid type, the principal mechanism and parts of which can be constructed and assembled in a compact unit within an easily handled, packaged and stored housing, and which requires little more beyond the housing than one or two probes connected by small diameter, flexible tubing to the mechanism contained within the housing.

Another object of the invention is to provide a pneumatically operated mileage indicator for boats, which may either rely on the water movement relative to the boat or on an independent source of vacuum or compressed air for its motivating force and which may be adjusted to compensate for various operating conditions including water currents encountered by the boat.

Additional objects and advantages of the invention will become apparent from the following description and accompanying drawings, wherein:

FIGURE 1 is a schematic view of the present mileage indicator with the parts thereof being shown in cross section and arranged with respect to one another to fully illustrate the construction and operation of the indicator;

2

FIGURE 2 is a cross sectional view of one of the component parts of the indicator illustrated in FIGURE 1, showing the part in a different operating position from that shown in FIGURE 1, in order to effectively illustrate the operation of the part; and FIGURE 3 is a side elevational view of the counter mechanism shown in FIGURE 1.

Referring more specifically to the drawings, and to FIGURE 1 in particular, the present mileage indicator consists basically of a vacuum motor 10 operating a counter or distance registering device 12, a vacuum creating means 14 for operating the vacuum motor, a variable control valve 16 for regulating the pressure delivered to the vacuum motor 10 from the vacuum creating means 14, and a pressure responsive control device 18 for operating the variable control valve. The foregoing components of the indicator may be arranged in various positions with respect to one another, and the vacuum motor 10, counter 12, control valve 16 and pressure responsive device 18 may be constructed in a compact unit and enclosed in a relatively small housing (not shown), the position of the various components shown in the drawing being merely for convenience in illustrating the operative and structural relationship between the parts. The boat or other water craft on which the present mileage indicator is installed is not shown; however, the vacuum creating means 14 and pressure responsive device 18, including a Pitot tube 20, are placed in a position as if the boat were moving from right to left as viewed in FIGURE 1; i.e., the flow of water relative to the boat being from left to right. The foregoing mileage indicator may be installed on various types of water craft, including small fishing boats for lakes, cabin cruisers and pontoon boats, whether power operated or not. The only portion of the foregoing instrument extending into the water consists of vacuum creating means 14 and Pitot tube 20, these two components being connected to the respective operating parts of the indicator by tubes extending through the hull or over the side of the boat into the water.

The vacuum motor 10 is a pulsating type consisting of a fixed base 30, and cup-shaped housing 32 mounted on base 30 and connected thereto by an annular flexible diaphragm 34 of the bellows type, the diaphragm being V-shaped in cross section with the upper and lower sides thereof being secured to the peripheries of the housing and base in fluid tight relationship. The housing 10 is an inverted cup-shaped member substantially fully enclosed throughout the upper portion and having an external annular flange 36 extending radially outwardly from the lower edge thereof for receiving the upper portion of diaphragm 34. The base and housing are rigid in construction and are preferably metal stampings, and the two parts together define a vacuum chamber 38, having an inlet passage 40 and an outlet passage 42 through base 30. Inlet passage 40 is controlled by a valve mechanism consisting of an annular member 44 having a stem 46 extending upwardly therefrom at its center and an inlet port 48 extending downwardly through stem 46 and communicating at its lower end with the atmosphere. The lower portion 50 of member 44 is disc-shaped and is adapted to move up and down in the chamber between the inner surface of base 30 and an annular stop or guide member 52 secured to the internal surface of base 30 and extending inwardly over the disc-shaped portion 50. Disc-shaped portion 50 is sealed to base 30 by a diaphragm-type sealing structure 54 secured at its upper edge to the underside of the disc-shaped portion and at its lower edge to the upper side of base 30 around inlet passage 40.

A valve element 60 is adapted to control the flow of air through port 48 and is supported in operating position by a stem 62 extending upwardly through port 48 into the hollow interior of a support member 64 which in turn is rigidly secured to the inner end of housing 32. The stem is secured in member 64 by a lost motion connection consisting of a slot 66 in stem 62 and a pin 68 extending through the slot and being secured in the side walls of member 64. The base 30 and housing 32 are urged apart by springs 70 and 72, spring 70 reacting between the upper surface of guide 52 and the lower surface of member 64, and spring 72 reacting between the upper end of member 46 and the lower end of member 64, the operation of these two springs in the vacuum motor being more fully described hereinafter. In order to provide an off and on operation of valve 60 a plurality of snap springs 76 are provided around the inlet end of passage 40 for engaging valve element 60 to retain it momentarily in either its closed or open position, as illustrated in FIGURES 1 and 2, respectively.

The vacuum motor 10 is connected to a conventional counter 12 or other type of motion registering instrument by a linkage consisting of a toothed wheel 80 mounted on a shaft 82 and a unidirectional pawl 84 pivotally mounted on a pin 86 on the side wall of the housing for the device. The wheel is operated by the motor through a lever 88 pivoted on a pin 90 near its center and connected to the motor by an arm 92 and pin 94, the arm being rigidly secured to the upper side of housing 32. The other end of lever 88 is connected to wheel 80 by a pawl 96 pivotally mounted on the end of lever 88 and urged into the notches of the wheel by a leaf spring 98 reacting between the pawl and a lug 100 on lever 88. Pin 90 is rigidly supported on the housing of the device or other suitable support by a boss 102.

The vacuum or negative pressure for operating motor 10 may be from an artificial source independent from the operation of the boat, or, as shown in the drawings, it may consist of a venturi forming the vacuum creating means 14. Chamber 38 of the motor is connected to venturi 110 by tubes 112 and 114 and variable control valve 16 inserted between the two tubes. This valve consists of a body 120 having valve chambers 122 and 124 separated from one another by a wall 126 with a centrally located orifice 128 therein for connecting the two chambers. Tube 112 connects chamber 38 of the motor to chamber 124 of the valve, and tube 114 connects chamber 122 with the throat 130 of venturi 110.

The degree of vacuum transmitted from venturi 110 to chamber 38 is controlled by a tapered valve element 140 controlled by pressure responsive device 18, consisting of a housing 142 separated into chambers 144 and 146 by a flexible diaphragm 148 secured between the two halves of housing 142. The center of diaphragm 148 is connected to valve element 140 by a linkage consisting of a rod 150 attached to a lever 152 pivoted on a pin 154 and a rod 156 connected at one end to lever 152 and at the other end to valve element 140. Rod 150 is firmly attached at one end to diaphragm 148 and pivotally attached at the other end to lever 152. Pin 154 is supported by a member 158 attached to a suitable support 160. Chamber 144 is connected by a tube 170 to a Pitot tube 172 having an inlet port 174 facing forwardly with respect to the direction the boat is traveling. Pressure created in Pitot tube 172 by movement of the boat in the water is transmitted through tube 170 to chamber 144 where it reacts on diaphragm 148, shifting rod 150 to the left and through lever 152 shifting rod 156 to the right, thus withdrawing tapered valve element 140 from port 128 and enlarging the port and permitting a greater vacuum to be created in chamber 38. The Pitot tube and venturi may be positioned in a suitable place beneath the water adjacent the hull of the boat. Rod 156 is held in fluid tight relationship with valve body 120 by a flexible boot 176, one end of which is sealingly secured to rod 156 and the other end to body 120.

In order to adjust the valve to varying boat operating conditions so that a greater or lesser degree of vacuum is created in chamber 38 for any given pressure created by Pitot tube 172, an adjustment mechanism 180 is incorporated in the variable control valve. The adjustment mechanism consists of a threaded stem 182 threadedly received in a bore 184 in the end of valve body 120. Stem 182 is held in a fixed position by a fixed support member 186 having a hole 188 through which stem portion 190 extends. A flange 192 is provided on stem 182 on one side of fixed support 186 and an operating knob 194 is rigidly mounted on stem portion 190 on the opposite side of support 186, thus preventing longitudinal movement of stem 182 as it is rotated by the operator through knob 194 and stem portion 190. As the stem is rotated, the threaded engagement with body 120 moves the body to the right or left, as viewed in FIGURE 1, thus shifting orifice 128 to the right or left along tapered valve element 140 and thus adjusting the flow of air through the orifice for any given setting or position of the valve element.

In the operation of the present mileage indicator, with the indicator being mounted on a power driven boat such as an outboard motor boat, with venturi 110 and Pitot tube 172 extending into the water beneath the boat, movement of the boat through the water creates a flow of water through venturi 110, thus creating a vacuum at throat 130 which is transmitted through tube 114, valve body 120 and tube 112 to chamber 38. Under the influence of the decreased pressure, housing 32 of the motor moves downwardly from the position shown in FIGURE 2 to the position shown in FIGURE 1, the downward movement of the housing first moving pin 68 from the upper to the lower end of slot 66, causing stem 62 and element 60 to move downwardly, forcing element 60 to the external side of spring member 76, thus opening passage 48 and temporarily retaining it in open position. As soon as port 48 is opened, air flows inwardly into chamber 38, thus relieving the vacuum sufficiently to permit springs 70 and 72 to move the housing upwardly initially and then spring 72 to complete the movement. Movement of the housing upwardly causes pin 68 to move from the lower end of slot 66 to the upper end, thereby engaging stem 62 and moving valve element 60 upwardly to the inner side of spring members 76 and thus closing the lower end of port 48. As soon as the lower end of port 48 has been closed, vacuum created by the venturi as transmitted to chamber 38 is again sufficiently great move housing 32 downwardly, repeating the previously described operation of valve element 60. Movement of housing 32 upwardly and downwardly oscillates lever 88 and pawl 96 on wheel 80, thereby causing a ratchet effect to be produced, rotating the wheel in steps which in turn register on counter 12 to indicate the mileage traveled by the boat.

In order to vary the degree of vacuum transmitted to chamber 38 in accordance with the speed of the boat, the pressure created at port 174 of Pitot tube 172 is transmitted to chamber 144 by tube 170, where it reacts on diaphragm 148 to move the diaphragm to the left as viewed in FIGURE 1, thereby operating the linkage to withdraw valve element 140 from orifice 128 to the point corresponding to the pressure created by the movement of the boat in the water; i.e., as the speed of the boat increases, the pressure in chamber 144 increases, thereby further withdrawing valve element 140 and permitting a greater vacuum to be created in chamber 38. The greater vacuum causes a faster upward and downward operation of the housing 32 of the motor for faster operation of the counter.

If desired, the entire control of the vacuum motor can be effected by pressure responsive device 18 controlling valve element 140 with a constant vacuum or pressure being supplied to chamber 122 from a suitable mechanical source. Various other changes and modifications may be made to satisfy requirements without departing from the scope of the present invention.

I claim:
1. A mileage indicator for a boat and other water craft, comprising a counter having a notched operating wheel, a vacuum operated motor including two relatively movable walls forming a chamber, a passage through one of said walls communicating with the atmosphere, a valve for controlling the flow of air through said passage having a stem operated by a lost motion connection with the other wall, a resilient member forming a delayed action means for said valve as said valve opens and closes said passage, spring means for urging said walls apart and said valve to its closed position, a lever connected to the other of said walls and having a pawl thereon for operating said wheel, a venturi adapted to be placed in the water for creating a vacuum, a conduit connecting the chamber of said motor with said venturi, a valve means in said conduit having an orifice therein and a tapered valve element in said orifice for varying the flow of air from said chamber and to said venturi means, and a device for operating said valve element in response to movement of the boat in the water including a housing having a chamber with a movable wall, linkage connecting said wall to said valve element, a Pitot tube adapted to be placed in the water facing forwardly with respect to the movement of the boat, a conduit connecting said tube with said last mentioned chamber, and manual means for adjusting said valve to vary said indicator in accordance with operating conditions.

2. A distance indicator for water craft, comprising a distance registering means, a motor including two relatively movable walls forming a chamber, a passage through one of said walls communicating with the atmosphere, a valve for controlling the flow of air through said passage having a stem operated by a lost motion connection with the other wall, a resilient member forming a delayed action means for said valve as said valve opens and closes said passage, spring means for urging said walls apart and said valve to its closed position, a pivoted lever connected to the other of said walls for operating said distance registering means, a venturi adapted to be placed in the water for creating a vacuum, a conduit connecting the chamber of said motor with said venturi, a valve means in said conduit having an orifice therein and a valve element for varying the flow of air from said chamber and to said venturi means, and a device for operating said valve element in response to movement of the craft in the water including a housing having a chamber with a movable wall, linkage connecting said wall to said valve element, a Pitot tube adapted to be placed in the water facing forwardly with respect to the movement of the boat, and a conduit connecting said tube with said last mentioned chamber.

3. A mileage indicator for water craft, comprising a counter, a motor including two relatively movable walls forming a chamber, a passage through one of said walls communicating with the atmosphere, a valve for controlling the flow of air through said passage having a stem operated by a lost motion connection with the other wall, a resilient member forming a delayed action means for said valve as said valve opens and closes said passage, spring means for urging said walls apart and said valve to its closed position, a pivoted lever connected to the other of said walls for operating said counter, a vacuum creating means, a conduit connecting the chamber of said motor with said vacuum creating means, a valve means in said conduit having an orifice therein and a tapered valve element in said orifice for varying the flow of air from said chamber and to said vacuum creating means, and a device for operating said valve element in response to movement of the craft in the water including a Pitot tube adapted to be placed in the water facing forwardly with respect to the movement of the craft.

4. A mileage indicator for water craft, comprising a counter, a motor including two relatively movable walls forming a chamber, a passage through one of said walls communicating with the atmosphere, a valve for controlling the flow of air through said passage having a stem operated by a lost motion connection with the other wall, a resilient member forming a delayed action means for said valve as said valve opens and closes said passage, spring means for urging said walls apart and said valve to its closed position, a lever connected to the other of said walls for operating said counter, a vacuum creating means, a conduit connecting the chamber of said motor with said vacuum creating means, a valve means in said conduit, for varying the flow of air from said chamber and said vacuum creating means, and a device for operating said valve means in response to movement of the craft in the water.

5. In a distance indicator for water craft, a counter, a vacuum operated motor including two relatively movable walls forming a chamber, a passage through one of said walls communicating with the atmosphere, a valve for controlling the flow of air through said passage having a stem operated by a lost motion connection with the other wall, a resilient member forming a delayed action means for said valve as said valve opens and closes said passage, spring means for urging said walls apart and said valve to its closed position, and a lever connected to the other of said walls for operating said counter.

6. A distance indicator for water craft, comprising a counter, a vacuum operated motor including two relatively movable walls forming a chamber, valve means for alternately connecting said chamber to, and blocking said chamber from, a source of higher pressure, whereby the pressure in said chamber is alternately increased and decreased to move one of said walls away from and toward the other of said walls, a lever connected to one of said walls for operating said counter, a vacuum creating means, a conduit connecting the chamber of said motor with said vacuum creating means, a valve means in said conduit for varying the flow of air between said chamber and said vacuum creating means, and a device for operating said last mentioned valve means in response to movement of the craft in the water.

7. A distance indicator for water craft, comprising a counter, a vacuum operated motor including two relatively movable walls forming a chamber, valve means for alternately connecting said chamber to, and blocking said chamber from, a source of higher pressure, whereby the pressure in said chamber is alternately increased and decreased to move one of said walls away from and toward the other of said walls, a lever connected to one of said walls for operating said counter, a vacuum creating means, a conduit connecting the chamber of said motor with said vacuum creating means, a valve means in said conduit, and a device for operating said last mentioned valve means in response to movement of the craft in the water.

8. A distance indicator for water craft, comprising a counter, a pneumatic motor including two relatively movable walls forming a chamber, a lever connected to one of said walls for operating said counter, a means for producing a pressure differential, valve means for alternately opening said chamber to, and blocking said chamber from, a source of pressure different from the pressure produced by said pressure differential producing means, whereby the pressure in said chamber is alternately increased and decreased to move one of said walls away from and toward the other of said walls, a conduit connecting the chamber of said motor with said pressure differential producing means, a valve means in said conduit for varying the flow of air between said chamber and said pressure differential producing means, and a device for operating said last mentioned valve means in response to movement of the craft in the water.

9. In a water craft distance indicator having a counter, a pneumatic motor for operating said counter including two relatively movable walls forming a chamber, a means for producing a pressure differential, valve means for alternately opening said chamber to, and blocking said chamber from, a source of pressure different from the pressure produced by said pressure differential producing means, whereby the pressure in said chamber is alternately increased and decreased to move one of said walls away from and toward the other of said walls, a conduit connecting the chamber of said motor with said pressure differential producing means, a valve means in said conduit for varying the flow of air between said chamber and said pressure differential producing means, and a device for operating said last mentioned valve means in response to movement of the craft in the water.

References Cited by the Examiner
UNITED STATES PATENTS 1,319,241 10/19 Nassen _____ 73—182
1,433,512 10/22 Lossing _____ 235—94 X LOUIS R. PRINCE, *Primary Examiner.*

LEONARD FORMAN, ISAAC LISANN, *Examiners.*